_United States Patent_ [19]

Okazaki

[11] Patent Number: 4,852,677

[45] Date of Patent: Aug. 1, 1989

[54] GUIDING METHOD FOR AUTONOMOUS TRAVELING VEHICLE

[75] Inventor: Mamoru Okazaki, Daitoh, Japan

[73] Assignee: Tsubakimoto Chain Co., Japan

[21] Appl. No.: 285,397

[22] Filed: Dec. 15, 1988

Related U.S. Application Data

[63] Continuation of Ser. No. 40,567, Apr. 17, 1987, abandoned.

[30] Foreign Application Priority Data

Jul. 14, 1986 [JP] Japan ................... 61-166061

[51] Int. Cl.$^4$ .............................. B62D 1/24
[52] U.S. Cl. .................. 180/169; 364/424.01
[58] Field of Search ................ 180/167, 168, 169; 364/424, 432, 450

[56] References Cited

U.S. PATENT DOCUMENTS 3,653,456  4/1972  Uemura ................. 180/168
4,530,057  7/1985  Ahlbom ................. 180/168

FOREIGN PATENT DOCUMENTS 2121741  1/1984  United Kingdom ........... 180/167

_Primary Examiner_—Charles A. Marmor
_Assistant Examiner_—Richard Camby
_Attorney, Agent, or Firm_—Darby & Darby

[57] ABSTRACT

This invention relates to a novel guiding method for autonomous travelling vehicle in which the number of the rotation of wheels mounted on both the right and left sides are individually detected when guiding the vehicle along the predetermined route by independently controlling the rotation of wheels mounted on both the right and left sides, and then based on the number of the rotations of these wheels and factors, such as the tread, determined by specification of the vehicle, the position and the azimuth of the vehicle are estimated. Then, based on the estimated position and the azimuth of the vehicle by referring to the predetermined route, the target position is set, and then, the vehicle is made to travel toward the set target position. Setting of the target positions and making the vehicle travel toward the set target position are repeated so that the vehicle is guided toward the route being set. When marks are detected while the vehicle travels, the position and azimuth of the vehicle are corrected, and at every time of correcting, the deviations of the position and azimuth are detected. Depending on whether the detected deviation is related to the position or the azimuth, the factor related to the detected deviation is varied and guiding of the vehicle is further executed.

3 Claims, 9 Drawing Sheets

GUIDING METHOD FOR AUTONOMOUS TRAVELING VEHICLE

This is a continuation of application Ser. No. 040,567, filed Apr. 17, 1987, now abandoned.

BACKGROUND OF THE INVENTION

1. Field of the Invention

The present invention relates to a guiding method for an autonomous travelling vehicle which is provided with a plurality of wheels mounted on both right and left sides, capable of independently rotating themselves.

2. Description of the Prior Art

Conventionally, there are a variety of guiding methods for making an autonomous vehicle, for example, autonomously travel itself. Typically, one of the conventional methods makes an unmanned vehicle travel along continuous route which are preliminarily set either by guidance cables or by optical tapes and the like. Another conventional system guides an unmanned vehicle by making itself identify environments of the travelling route by applying electric waves or light so that it can proceed its own route in accordance with data thus identified. Another conventional method guides an unmanned vehicle by applying a presumptive navigation method.

However, the method which provides the unmanned vehicle with its route by means of guiding cables unavoidably obliges the investor to spend much expenses and time for establishing the route. Actually, once the route is established, this cannot easily be modified or changed. As for an optical tape, due to soil deposited on the surface of it after continuous services for many years, accuracy for detecting the route of the unmanned vehicle unavoidably lowers. Furthermore, such a conventional method making the unmanned vehicle travel along its route using electric waves or light for identifying environment of route easily incurs unwanted obstruction from external, thus lowering the accuracy for correctly detecting the route.

To solve those problems mentioned above, the Japanese Patent Laid-Open No. 57-120118 (1982) proposes a method for guiding a travelling object such as an unmanned vehicle for example, by providing it with information of the route by applying a presumptive navigation method.

This system first detects the distance covered and the turning angle of the unmanned vehicle and then detects the present position and posture angle against the reference point by seeking the sum of the travelling track in accordance with the detected information. Simultaneously, this method sets coordinate XY on the floor on which the vehicle travels as shown in FIG. 1, while it also sets the route C and fixed points P0, P1, P2, - - - on the route C. Using each of these fixed points for making up origin, the method sets coordinate xy respectively so that tangent of each of these fixed points can correctly match axis y. Each fixed point denotes its position by applying coordinate xy, the origin of coordinate xy is made of the next fixed point being present in front of the proceeding direction of the travelling vehicle. An operator preliminarily sets a specific angle formed against the origin as the variable part of the posture angle of fixed points.

More particularly, as shown in FIG. 1, the operator preliminarily sets an angle $\theta m$ being made up with axis y of the coordinate xy having the next fixed point Pm+1 as the origin against fixed point Pm in order that the angle $\theta m$ can become variable part $\Delta\theta m$ of the posture angle of the fixed point Pm. While the unmanned vehicle travels, it sequentially seeks the travelling speed and the steerage angle by referring to the present position and the azimuth on the coordinate xy having the next fixed point Pm+1 as the origin, while the vehicle also refers to the deviation angle $\theta m$ against the origin Pm+1. The unmanned vehicle then subtracts the steerage angle from the variation $\Delta\theta m$ of the posture angle which has been read when passing through the fixed point Pm, and then the unmanned vehicle travels in the direction of the origin Pm+1 in order that the variation $\Delta\theta m$ can be reduced to zero. In other word, this is one of the origin-pursuing guiding methods for making the unmanned vehicle first read the variation $\Delta\theta m$ of the posture angle every time when it reaches the fixed point Pm and then repeats the identical running processes by sequentially renewing the origin Pm+1 in order that it can correctly follow up travelling by being guided throughout the route.

Conventionally, any of those guiding methods using the presumptive navigation method provides means for confirming and correcting for the absolute position of the travelling object, which can be executed in any optional location of the route. Conventionally, a method called "fixed-point correction method" is known, which makes the unmanned vehicle firstly identify the externally provided marks before eventually confirming and correcting for the absolute position of the travelling vehicle itself.

The Japanese Patent Laid-Open No. 51-53870 (1976) proposes a method in conjunction with the presumptive navigation method for detecting the present position and the azimuth of the travelling object, where this invention provides means for allowing the control system of the travelling object to independently count the number of pulses generated by a pair of pulse counters installed on the left and right wheels respectively of the travelling object at every extremely short period of time, and then based on the counted values, the control system computes variation of the average speed and the azimuth of the travelling object before eventually determining the present position and the azimuth of the travelling object.

As is clear from the above description, the guiding method proposed by the invention related to the Japanese Patent Laid-Open No. 57-120118 (1982) obliges the operator to preliminarily and sequentially store data related to the variable values of the posture angle of the travelling object at a number of objective points provided on the routes into memory means, thus involving complex procedures. Furthermore, despite being the guiding method based on the presumptive navigation method, this invention however does not specify means for correcting for guidance error that may take place with the presumption error.

On the other hand, according to the invention related to the Japanese Patent Laid-Open No. 51-53870 (1976), since the present position and the azimuth of the travelling object are detected in accordance with the rotation of wheels, errors can easily be generated by either slipping or noise of these wheels, thus eventually causing deviation to occur to the present position and the azimuth of the travelling object. In addition, since this invention is totally dependent on the externally provided units for identifying error and deviation, this method can only execute rough correction thus unavoidably resulting in the poor guidance accuracy.

SUMMARY OF THE INVENTION

The present invention has been achieved to thoroughly solve those problems mentioned above.

The primary object of the present invention is to provide a novel method for guiding an autonomous travelling vehicle capable of correctly guiding the travelling vehicle along the predetermined travelling route by totally dispensing with complicated operations otherwise needed for preliminarily storing a variety of data related to target position for guiding the autonomous travelling vehicle and also dispensing with conventional travelling route using either guidance cables or optical tapes.

The second object of the present invention is to provide a novel method for guiding the autonomous travelling vehicle featuring extremely fine precision by fixed point correction to allow the travelling vehicle to properly correct for its present position and azimuth during its travelling.

The third object of the present invention is to provide a novel method for guiding the autonomous travelling vehicle which is capable of securely inhibiting occurrence of erroneous travelling of the travelling vehicle even after serving for many years by detecting the deviation of the position and the azimuth of the travelling vehicle against the predetermined travelling routes, and then based on the detected result, the factors related to the specification of wheels such as tread, for example, is varied in order that the travelling vehicle can precisely be guided throughout the designated routes.

The guiding method for an autonomous travelling vehicle of the present invention travels along predetermined route by individual control of rotation of the wheels mounted on both the right and left sides of travelling direction thereof so that the travelling direction of said autonomous travelling vehicle is controlled, wherein a plurality of marks are previously arranged along said route for fixed point correction, and steps, for individually detecting the number of the rotations of said wheels, for estimating the position and azimuth of said autonomous travelling vehicle based on detected number of rotations of said wheels and factors determined by the specification of said autonomous travelling vehicle, for guiding said autonomous travelling vehicle toward said route based on the estimated position and azimuth and said route, are comprised and when any one of said marks are detected, the position and azimuth of said autonomous travelling vehicle are detected based on the relationship of relative position between said detected mark and said autonomous travelling vehicle, the deviation of the detected position and azimuth from said estimated position and azimuth are detected, said factors related to said deviation are changed, and further guiding of said autonomous travelling vehicle is executed based on the varied factors.

The above and further objects and features of the invention will more fully be apparent from the following detailed description with accompanying drawings.

DESCRIPTION OF THE PREFERRED EMBODIMENTS

Figure 1:
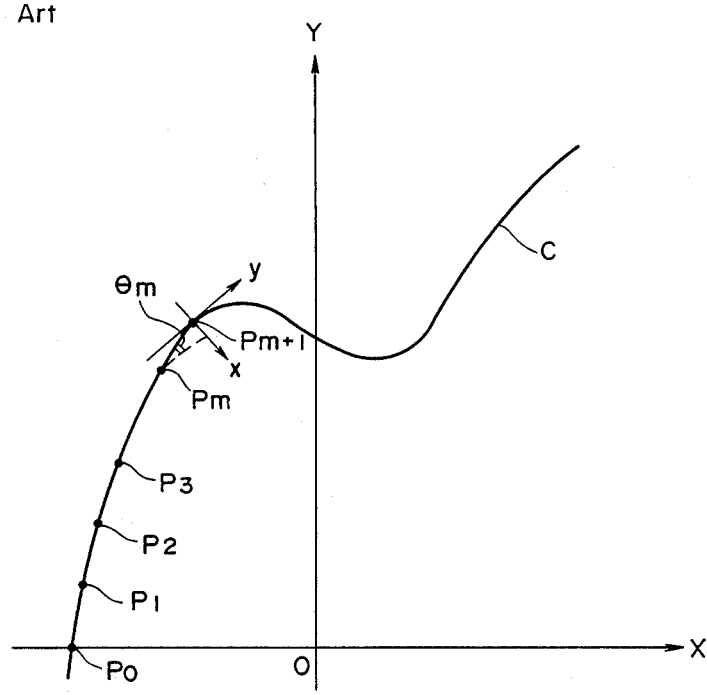
FIG. 1 is the simplified conceptual diagram of a conventional guiding method.
Figure 2:
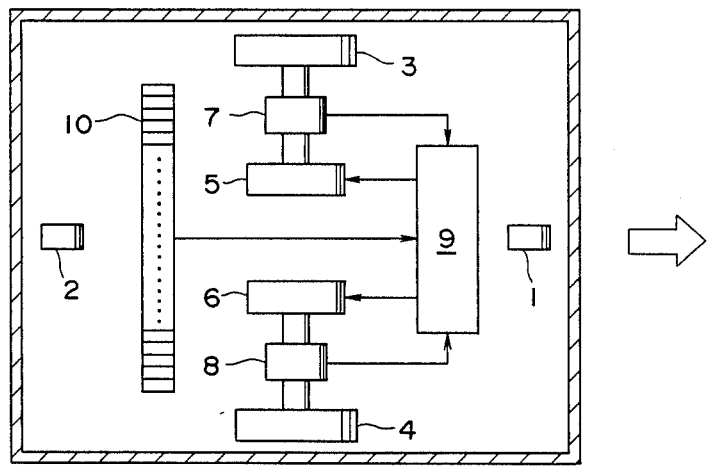
FIG. 2 is the simplified schematic diagram denoting the constitution of an unmanned vehicle.

Referring more particularly to the accompanying drawings, one of the preferred embodiments of the present invention is described below. FIG. 2 is the simplified schematic diagram denoting the constitution of an autonomous unmanned vehicle. Casters 1 and 2 are respectively installed on the front and rear edges of the autonomous unmanned vehicle.

A pair of wheels 3 and 4 are respectively installed on both sides of the unmanned vehicle in its center portion in the travelling direction, and these wheels are driven by motors 5 and 6, respectively. These wheels 3 and 4 are provided with a pulse generator 7 and 8 respectively which generate pulses in accordance with the number of times of the rotations of these wheels 3 and 4. Control circuit 9 reads pulses from pulse generators 7 and 8 and discretely controls the speed and direction of the rotation of motors 5 and 6 in order to correctly control the travelling speed and direction of the unmanned vehicle by driving the wheels 3 and 4 for executing the needed steering operation.

Figure 3:
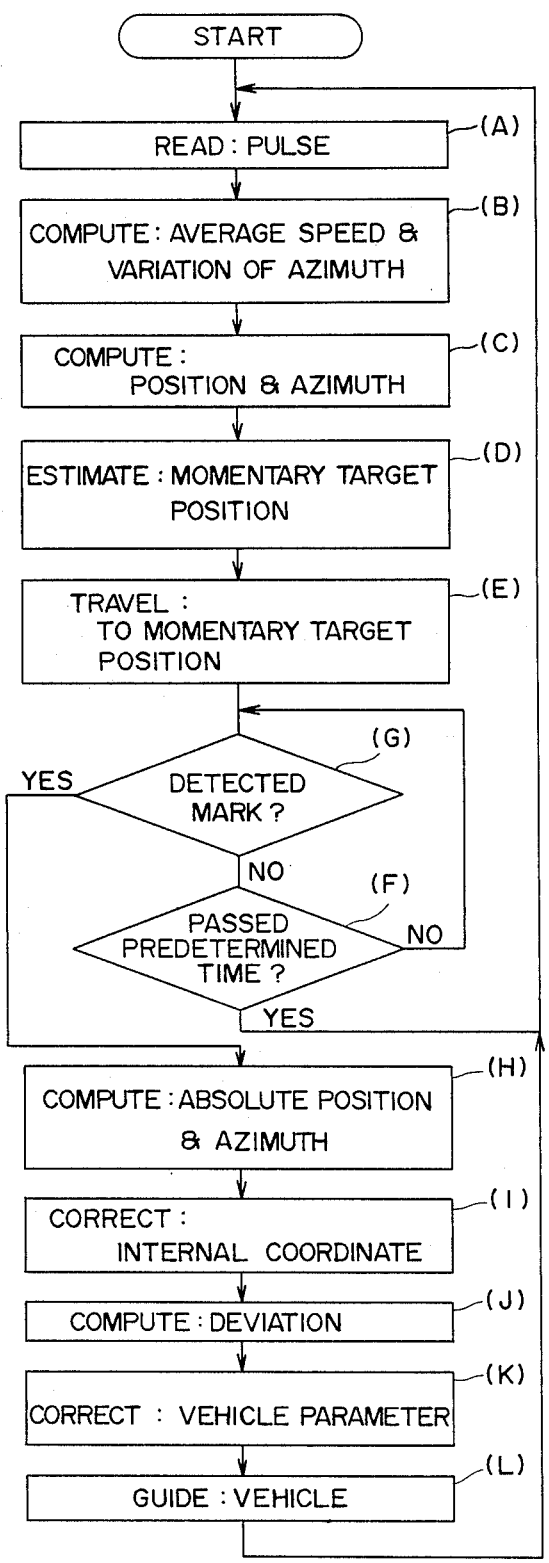
FIG. 3 is the operation flowchart describing the operation procedure of the guiding method related to the present invention.

Referring now to the operation chart of FIG. 3, the guiding method of the present invention for the autonomous unmanned vehicle having the above constitution is described below.

At first, assume that the coordinate XY (hereinafter called the external coordinate) is set on the floor as a basis for computing the absolute position of the vehicle and its azimuth. And at the control circuit 9 of the vehicle, the coordinate xy (hereinafter called the internal coordinate) is set as a control basis the vehicle itself. At the starting of controlling, the internal coordinate is to be coincided with the external one. Further, the travelling route of the vehicle being set on the external coordinate is also set on the internal one, and the vehicle is basically to be so guided as to go along with the route being set on the internal coordinate.

When operational step A is executed, control circuit 9 discretely reads pulses generated by pulse generators 7 and 8 in response to the rotation of wheels 3 and 4 on both sides of the vehicle, and then based on the number of times of pulses counted, the control circuit 9 computes the average speed and the amount of varied azimuth of the travelling vehicle during step B. Next, based on the computed average speed and the amount of varied azimuth, the control circuit 9 then seeks the present position and the azimuth of the travelling vehicle on the internal coordinate xy during the next step C. The control circuit 9 then provisionally determines a momentary target position based on the present position, the azimuth, and the predetermined route of the vehicle during the next step D. When step E is executed, the control circuit 9 guides the vehicle in the direction of the target position. When step F is executed, the control circuit 9 causes the entire guiding method to repeatedly follow up those sequential processes mentioned above at every specific time so that the vehicle can correctly be guided to travel the predetermined route.

A pair of magnets functioning as a unit of correction point are positioned along the route on the floor. When the vehicle passes through the correcting point, a sensor 10 of the vehicle detects the presence of these magnets during the next step G. This makes the control circuit 9 correctly compute the absolute position and the azimuth of the travelling vehicle on the external coordinate XY provided on the surface of the route during the next step H. When step I is executed, the control circuit 9 substitutes the present position and the azimuth of the travelling vehicle on the internal coordinate during computation for the computed absolute position and the azimuth of this vehicle to complete correction for the internal coordinate so as to be coincided with the external use. After completing correction for the internal coordinate, step G is executed, where the guiding method leads the travelling vehicle to the predetermined route while inhibiting occurrence of yawing.

Next, actual methods of detecting the position and the azimuth and of guiding the travelling vehicle and of the correction are described below by applying operational equations.

Assume that the autonomous travelling vehicle starts its travel from an optional position and the sampling period of pulse signals from the pulse generators 7 and 8 is $\tau$, whereas the order of sampling period is i. The order of sampling period i denotes the order of the control over a series of guiding the travelling vehicle including computation of the present position and the azimuth of the vehicle, provision of momentary target position, and the fixed points correction, to be described later on. Assume that the number of pulses generated from the rotation of the left and right wheels 3 and 4 during a sampling period $\tau$ from time i$\tau$ is respectively denoted to be $P_{Li}$ and $P_{Ri}$, whereas the travelling distance of these wheels 3 and 4 per pulse is respectively denoted to be $H_L$ and $H_R$, and then the speeds $V_{Li}$ and $V_{Ri}$ of the left and right wheels respectively and the average speed $V_{ci}$ at the center point (called the representative point of the vehicle) of these wheels 3 and 4 are denoted by equations shown below.

$$V_{Li} = H_L \cdot P_{Li}/\tau \quad (1)$$

$$V_{Ri} = H_R \cdot P_{Ri}/\tau \quad (2)$$

$$V_{ci} = (V_{Li} + V_{Ri})/2 \quad (3)$$

Assume that tread between wheels on both the sides is T, and then, the amount of varied azimuth of the vehicle $\Delta\theta_{ci}$ is denoted by the equation shown below.

$$\Delta\theta_{ci} = (V_{Li} - V_{Ri})\tau/T \quad (4)$$

where $H_L$, $H_R$, and T are respectively the coefficients to be constantly determined by the travelling vehicle specification (hereinafter called the vehicle factor). Forward turn of $P_L$ and $P_R$ is denoted to be plus, whereas inverse turn of $P_L$ and $P_R$ is denoted to be minus.

Assume that the position of the representative position of the vehicle at a period of time $(i-1)\tau$ is $c_i-1$ $(x_{ci}-1, y_{ci}-1)$ and the forwarding direction $\theta_{ci}-1$, approximate position of the vehicle at time i$\tau$ and approximate forwarding azimuth $\theta_{ci}$ at time i$\tau$ are respectively denoted by equations shown below.

$$x_{ci} = x_{ci-1} + V_{ci} \cdot \tau \sin(\theta_{ci-1} + \Delta\theta_{ci}/2) \quad (5)$$

$$y_{ci} = y_{ci-1} + V_{ci} \cdot \tau \cos(\theta_{ci-1} + \Delta\theta_{ci}/2) \quad (6)$$

$$\theta_{ci} = \theta_{ci-1} + \Delta\theta_{ci} \quad (7)$$

When seeking the average speed of the vehicle by applying equation (1) through (3), certain areas of wheels 3 and 4 respectively remain in contact with the floor surface. In this case, a certain point of these areas is considered to be the representative point, while assuming that the vehicle travels its route at a constant speed. When applying equations (4) through (7), travelling path of the vehicle is considered to be linear. However, since the sampling period $\tau$ denotes an extremely short duration, no substantial error can take place. When applying equations (1) through (7), when $P_{Li}$ and $P_{Ri}$ are both negative, the vehicle travels backward, whereas when either of $P_{Li}$ and $P_{Ri}$ is positive and the other negative, the vehicle keeps on moving while making spin turns.

Figure 4:
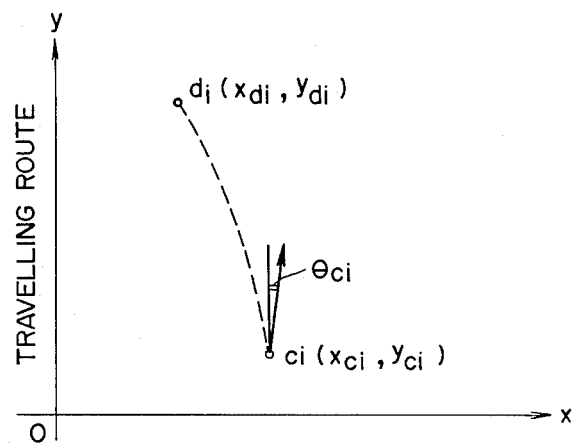
FIGS. 4 and 5 are respectively the conceptual diagram denoting the conditions of guiding an unmanned vehicle related to the preferred embodiments of the present invention.

Next, the method of guiding the vehicle to the predetermined route is described below. Assume that the linear route is provided in this case and it correctly matches axis Y. Like wise, it is assumed that, after starting off from the origin of the external coordinate, the travelling vehicle kept on travelling, and then it travels off from the route and has reached the present position Ci $(x_{ci}, y_{ci})$ of the internal coordinate in the azimuth denoted to be $\theta_{ci}$. Accordingly, the deviation of position of the vehicle is denoted to $x_{ci}$ and the deviated amount that of azimuth $\theta_{ci}$, respectively. Based on the travelling speed $V_{ci}$ of the vehicle at position $c_i$ when those deviated amounts are present, the vehicle guiding operation is executed by provisionally setting the momentary target position $d_i$ $(x_{di}, y_{di})$ shown in FIG. 4. The target position $d_i$ is denoted by the equations shown below.

$$x_{di} = K1 x_{ci} + K2 \theta_{ci} \quad (8)$$

$$y_{di} = y_{ci} + K2|\theta_{ci}| + K3 V_{ci} + K4 \quad (9)$$

$$[0 \leq K1 < 1, \ 0 \leq K2, \ 0 < K3, K4]$$

Note that K1 through K4 respectively denote coefficients or constants adjusting weight of each deviated amount, in particular, K1 denotes the position coefficient, K2 the azimuth coefficient, K3 the velocity coefficient, and K4 the position constant, respectively.

Figure 5:
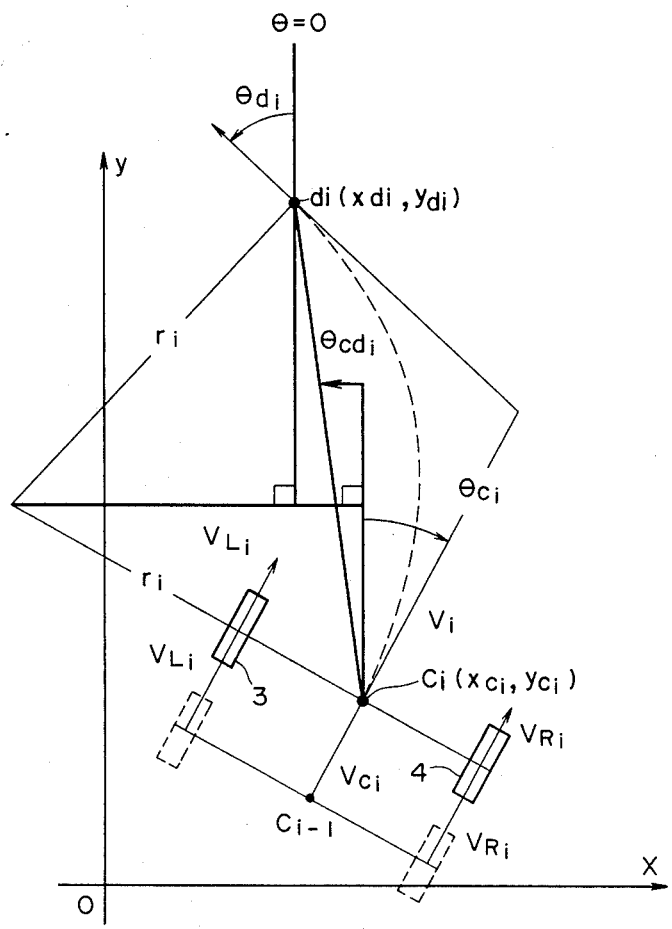

FIG. 5 is the chart denoting that the vehicle guiding path varies when the values of K1 and K2 are varied. Based on this, it is possible for the guiding method related to the present invention to fixedly set an optimum coefficient by preliminarily executing experiments or simulated measurements while varying coefficients. When the azimuth of the vehicle excessively deviates, the guiding method related to the invention also makes it possible to set the momentary target position at a relatively far point to allow the front end of the vehicle to moderately vary its direction to effectively prevent the vehicle from incurring yawing. Conversely, when the azimuth of the vehicle negligibly deviates, it is also possible for the guiding method related to the invention to set the momentary target position at a point close to it and set a plurality of coefficients in order that the actual route of the vehicle can be converged into the predetermined route within a short distance so that an optimum coefficient can be chosen from a plurality of coefficients depending on the circumstances.

Figure 6:
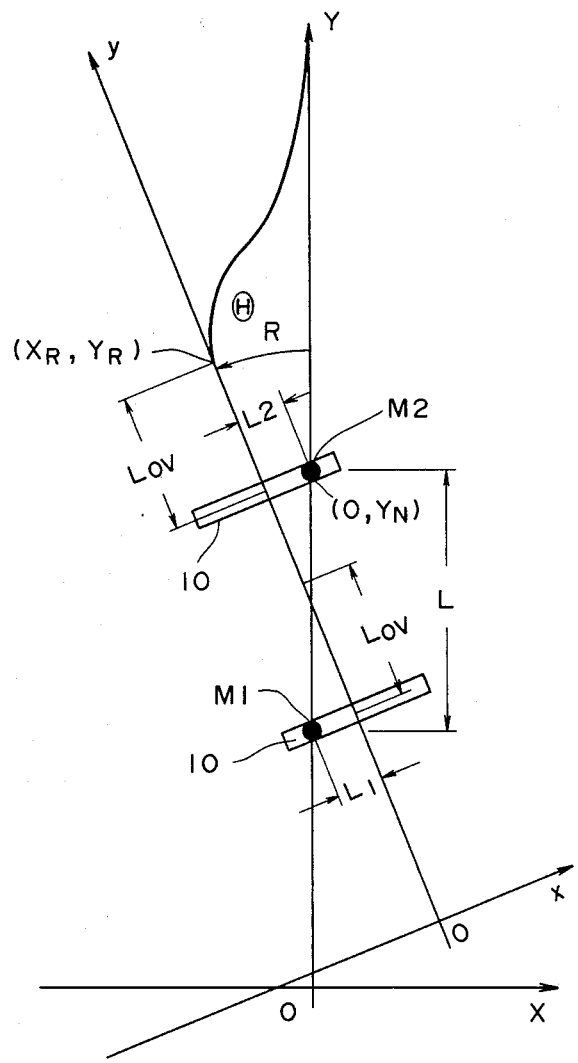
FIG. 6 is the chart explaining the principal of the error correction using magnet.

The preferred embodiment employs means for allowing the vehicle to travel in the manner of drawing an arc between positions $c_i$ and $d_i$. As shown in FIG. 6, this method calculates the designated velocity $V_{Li,cmd}$ and $V_{Ri,cmd}$ of wheels on both sides of the vehicle when the vehicle travels along the assumed arc within a sampling period $\tau$ from time $i\tau$ passing through position $c_i$ and $d_i$, the arc being in contact with the line extended in the vehicle forwarding direction forming angle $\theta_{ci}$ against axis y. Based on the relationship shown in FIG. 6, angle $\theta_{ci}$ seen from position $c_i$ to position $d_i$ is geometrically denoted by the equation shown below.

$$\theta_{cdi} = \tan^{-1}\{(x_{di}-x_{ci})/(y_{di}-y_{ci})\} \quad (10)$$

Next, based on the relationship shown in FIG. 6, the travelling azimuth $\theta_{di}$ of the vehicle and radius $r_i$ of the turning of the vehicle when the vehicle is exactly at position $d_i$ after travelling along the above arc are geometrically calculated by the equations shown below.

$$\theta_{di} = 2\theta_{cdi} - \theta_{ci} \quad (11)$$

$$r_i = |(y_{di}-y_{ci})/\sin\theta_{di} - \sin\theta_{ci}| \quad (12)$$

On the assumption that the command average velocity within a period $\tau$ from time $i\tau$ is $V_i$ and based on the radius value $r_i$, the command velocity of both wheels 3 and 4 during the left turn (where $\theta_{ci} > \theta_{di}$) can be calculated by the equation shown below.

$$\left.\begin{array}{l}V_{Li,\,cmd} = (r_i - T/2)\,V_i/r_i\\ V_{Ri,\,cmd} = (r_i + T/2)\,V_i/r_i\end{array}\right\} \quad (13)$$

Conversely, the command velocity of both wheels 3 and 4 during the right turn (where $\theta_{ci} > \theta_{di}$) can be calculated by the equation shown below.

$$\left.\begin{array}{l}V_{Li,\,cmd} = (r_i + T/2)\,V_i/r_i\\ V_{Ri,\,cmd} = (r_i - T/2)\,V_i/r_i\end{array}\right\} \quad (14)$$

By repeatedly executing operations denoted by those equations (1) through (14) shown above at every period $\tau$, the guiding method related to the present invention correctly guides the vehicle throughout its route having a number of minimal arcs with a radius being different from each other, and connected to each other smoothly so that the vehicle can eventually be converged into axis y which is actually the predetermined route.

To smoothly guide the vehicle in any circumstances, the guiding method related to the present invention divides distance between the target position $d_i$ on the internal coordinate and the present position $c_i$ ($x_{ci}$, $y_{ci}$) of the vehicle into three steps in reference to their relative position relation ship so that the command velocity $V_i$ of the vehicle can properly be controlled by applying three different steps including acceleration, constant speed, and deceleration. The command velocity is sought by the equations shown below.

During acceleration $\quad V = a i\tau [0 \leq y_{ci} < L_{acc}] \quad (15)$

During constant-speed $\quad V_i = V\text{const}[L_{acc} \leq y_{di},\ L_{ri} > L_{acc}] \quad (16)$ During deceleration $\quad V_i = V\text{const}\sqrt{\dfrac{L_{ri}}{L_{acc}}}\ [L_{ri} < L_{acc}] \quad (17)$ where
$\alpha$ indicates acceleration (mm/s$^2$),
Vconst indicates the designated speed (mm/s),
$y_{di}$ indicates coordinate (mm) of the momentary target position axis y,
$L_{ri}$ indicates the distance remaining to the target position (mm) = $y_{di} - y_{ci}$, and
$L_{acc}$ indicates Vconst/$2\alpha$ Next, the guiding method controls velocity by applying PID (proportional plus integral plus and derivative) control means to the command velocity $V_{Li}$, cmd and $V_{RI}$, cmd of both wheels 3 and 4 calculated by the above equations (13) and (14). This is denoted by the equations shown below.

$$EV_{Li} = V_{Li,\,cmd} - V_{ci} \quad (18)$$

$$V_{Li,\,out} = V_{Li,\,cmd} + G1 EV_{Li} + G2 \sum_{n=1}^{i} EV_{Ln} + \quad (19)$$

$$G3(EV_{Li} - EV_{Li-1})$$

where $V_{ci}$ denotes the average velocity of both wheels at the present position $c_i$, whereas $V_{Li}$ out denotes the left-wheel command velocity output value, and G1 through G3 are respectively the control coefficients. Equations (18) and (19) respective denote the control of the velocity of the left wheel 3. The same equation is applicable to the control of the velocity of the right wheel. Execution of the control of the velocity of the travelling vehicle allows wheels to smoothly rotate themselves so that external irregularity of the rotation of wheels caused by slipping can be prevented.

However, while guiding the travelling vehicle based on the position and the azimuth of the vehicle itself on the internal coordinate, a certain deviation takes place between the position and the azimuth of the vehicle on coordinate XY (external coordinate) which is conceptually provided on the surface of the route and the position and the azimuth of the vehicle on coordinate xy (internal coordinate). In other words, since the position and the azimuth of the travelling vehicle are respectively determined by accumulative computations of minimal amounts of varying positions and azimuths of the travelling vehicle, erroneous data can easily be generated by noise caused by uneven route surface and/or slip movement of wheels, while certain errors can also accumulate themselves due to inadequate vehicle coefficients $H_L$, $H_R$, and T related to equations (1), (2), and (4) shown earlier. This evenutally causes a certain deviation to take place with the results of computing operations.

To thoroughly eliminate these errors from the computing operations, even the slightest deviation of the position on the internal coordinate against the absolute position of the travelling vehicle should be corrected at an optional position.

Figure 7:
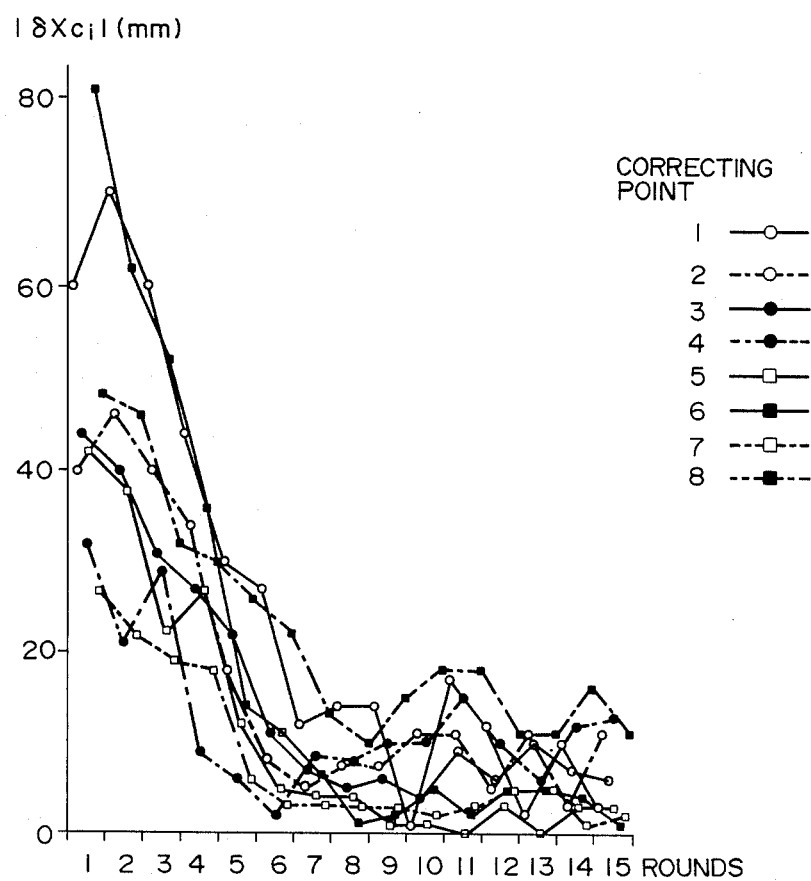
FIGS. 7 and 8 are the charts denoting the variation of the deviation amounts of the position and the azimuth by the present invention.

Actually, one of the prior arts has developed a method for correcting the position on the internal coordinate deviated from the absolute position of the travelling vehicle by applying a reference object being set on either the surface of the route of the lateral position of the route. However, the preferred embodiment of the guiding method of the invention implements; the fixed point corrected by applying a plurality of magnets positioned on the surface of the route at predetermined intervals. Referring now to FIG. 7, the correction procedure of the invention is described below.

A pair of magnets M1 and M2 are positioned on the predetermined route, hereupon, on axis Y at intervals L. Assume that magnet M1 at the start-up point of the vehicle is designated to be the advance node, whereas magnet M2 in front of the vehicle forwarding direction is designated to be the correction node (O, $Y_N$). As shown in FIG. 2, the center bottom part of the vehicle is provided with a magnet sensor 10 in which a plurality of magnetism-sensing elements are installed in parallel with each other in the lateral direction to the forwarding direction of the vehicle.

As soon as the vehicle passes through magnets M1 and M2 on the surface of the route while travelling itself in accordance with the route on the internal coordinate, magnet sensor 10 detects lateral displacement L1 and L2, more particularly, the displacement of orthogonal component of the target position to the travelling direction are respectively detected by magnetic sensor 10. On the assumption that the vehicle proceeds distance $L_{OV}$ while the correction computation is underway after those displacement amounts are detected, points $X_R$ and $Y_R$ are respectively designated to be the position at which operation for correction of the deviated internal coordinate position starts off.

The correction start-up positions $X_R$ and $Y_R$ and the azimuth $\Theta_R$ can geometrically be computed in reference to FIG. 7 by applying equations shown below.

$$\Theta_R = \tan^{-1}\{(L1-L2)/L\} \tag{20}$$

$$X_R = -L2 \cdot \cos \Theta_R + L_{OV} \cdot \sin \Theta_R \tag{21}$$

$$Y_R = Y_N - |L2| \cdot \sin |\Theta_R| + L_{OV} \cdot \cos \Theta_R \tag{22}$$

By substituting values of positions $x_{ci}$ and $y_{ci}$ and azimuth value $\theta_{ci}$ of the vehicle containing the accumulated error on the internal coordinate for values $X_R$ and $Y_R$ related to the absolute position and the azimuth value $\theta_R$ of the vehicle on the external coordinate thus calculated, the internal coordinate correctly coincides the external coordinate, and as a result, the state is initialized to eventually complete the designated operation for correcting the displacement of the position on the internal coordinate.

To implement correction of the displaced position on the internal coordinate, a pair of reference points are needed. The preferred embodiment of the present invention applies a pair of magnets as the correction points. Every time the travelling vehicle passes through these correction points, the internal coordinate is initialized and the displacement on the internal coordinate against the external coordinate is corrected so that the vehicle can correctly be guided throughout the predetermined route on the floor.

The vehicle factors $H_L$, $H_R$, and T are respectively the elements for determining the values of equations (1) through (7) which execute computation of the position and the azimuth of the travelling vehicle on the internal coordinate, and thus, if any error is present in these factors, it will cause a certain deviation to be generated between the computed vehicle position and azimuth on the internal coordinate and the absolute position and azimuth of the vehicle. Independent of the cause of generating deviation, the actual deviation is corrected by the fixed point correction mentioned above. However, if the vehicle factors are settled, the travelling vehicle causes identical deviations to repeatedly take place even after applying the fixed point correcting, thus eventually resulting in the lowering precision of guiding. Furthermore, when error increment due to significantly worn vehicle wheels after continuous services for many years, it becomes extremely difficult for the guiding method to guide the vehicle to a specific area where the fixed point correction is executed.

As a result, to securely prevent the precision in guiding from lowering itself and guide the vehicle to a specific area where the fixed point correction can be properly carried out, the preferred embodiment of the present invention provides means for adequately varying the vehicle factors at an optimum position while the vehicle keeps on travelling itself. Method for changing the vehicle factor is described below.

Assume that the vehicle factors $H_L$, $H_R$, and T are respectively free from error factors in the preceding equations (1) through (7) for respectively detecting the position and the azimuth of the travelling vehicle on of the internal coordinate, while the following equations (23) through (25) respectively contain certain errors $\delta H_L$, $\delta H_R$, and $\delta T$. Based on this, when $H_L$ and $H_R$ respectively denote pulse factors and T is substituted by $1/T=A$, $1/(T+\delta T)=(A+\delta A)$ so that A can denote tread factors, on the assumption that certain errors accumulate in those equations (1) through (7), the position and the azimuth of the travelling vehicle immediately after periods n have past while applying those equations (1) through (7) used for each sampling period can be calculated by the following equations (23) through (25) in conjunction with preceding equations (5) through (7).

$$x_{ci} = x_o + \sum_{n=1}^{i} 1/2\{(H_L + \delta H_L) P_{Ln} + (H_R + \delta H_R) P_{Rn}\} \cdot \tag{23}$$

$$\sin[\sum_{n=1}^{i-1}(A+\delta A)\{(H_L + \delta H_L) P_{Ln} - (H_R + \delta H_R) P_{Rn}\} +$$

$$1/2(A+\delta A)\{(H_L + \delta H_L) P_{Li} - (H_R + \delta H_R) P_{Ri}\} + \theta_o]$$

$$y_{ci} = y_o + \sum_{n=1}^{i} 1/2\{(H_L + \delta H_L) P_{Ln} + (H_R + \delta H_R) P_{Rn}\} \cdot \tag{24}$$

$$\sin[\sum_{n=1}^{i-1}(A+\delta A)\{(H_L + \delta H_L) P_{Ln} - (H_R + \delta H_R) P_{Rn}\} +$$

$$1/2(A+\delta A)\{(H_L + \delta H_L) P_{Li} - (H_R + \delta H_R) P_{Ri}\} + \theta_o]$$

$$\theta_{ci} = \theta_o + \sum_{n=1}^{i}(A+\delta A)\{(H_L + \delta H_L) P_{Ln} - \tag{25}$$

$$(H_R + \delta H_R) P_{Rn}\}$$

To implement those equations (23) through (25), the following conditions are previously set while the vehicle travels on straightforwardly.

(A) Wheels on both sides of the vehicle are equal travelling distance per pulse ($H_L = H_R = H$).

(B) Wheels rotate themselves at a constant speed ($P_{Li}=P_L$, $P_{Ri}=P_R$).

(C) Vehicle travels straightforwardly against the floor surface ($P_L=P_R=P$, thus the travelling distance $Lds=iHP$).

(D) Vehicle start-off position can optionally be provided on the internal coordinate (typically, $xo=yo=\theta o=0$ in the present embodiment).

(E) Those arcs in equations (23) and (24) can respectively approximate themselves to linearity allowing the vehicle to travelling by a short distance at each sampling period.

In addition to those assumptions (A), (B) and (D) related to the straightforward movement of the vehicle, the following condition is assumed when the vehicle makes a spin turn.

(F) The vehicle turns its direction at the fixed point on the floor surface ($|P_L|=|\Pi_R|=P$, $P_L=+P_R$). The absolute position $X_R$ and $Y_R$, absolute azimuth, $\Theta_R$, and the deviated amounts of these $\delta X_{ci}$, $\delta Y_{ci}$, and $\delta\Theta_{ci}$ computed from equations (20) through (22) during the fixed point correction as mentioned above, are respectively denoted by the equations shown below.

$$\delta X_{ci}=X_R-x_{ci} \quad (32)$$

$$\delta Y_{ci}=Y_R-y_{ci} \quad (33)$$

$$\delta\Theta_{ci}=\Theta_R-\theta_{ci} \quad (34)$$

Based on those assumptions and equations shown above, deviated amounts of the position and the azimuth of the travelling vehicle are sought from equations (23) through (25). Assume that $(\delta H_L+\delta H_R)/2=\delta H$, when the vehicle travels straightforward, $$\delta X_{ci} = \frac{A}{H}(\delta H_L - \delta H_R) Lds^2 \quad (26)$$

$$\delta Y_{ci} = \frac{\delta H}{H} \cdot Lds \quad (27)$$

$$\delta\Theta_{ci} = \frac{A}{H}(\delta H_L - \delta H_R)Lds \quad (28)$$

On the other hand, when the vehicle makes spin turns, the following equations are made available for seeking the deviated amounts of the position and the azimuth of the vehicle itself.

$$\delta X_{ci} = i\delta HP \sin(2iAHP) \quad (29)$$

$$\delta Y_{ci} = i\delta HP \cos(2iAHP) \quad (30)$$

$$\delta\Theta_{ci} = 2\frac{\delta H}{H} \cdot Lds + 2\delta A \cdot Lds \quad (31)$$

Reviewing the casual relationship between the deviation of the position and the azimuth of the travelling vehicle and the factor error from the above equations (26) through (31), the difference of the left and right pulses factor error shown in equation (26) mainly affects the horizontal position deviation $\delta X_{ci}$, whereas the average error $\delta H$ of the left and right pulses factor shown in equation (27) affects the deviation $\delta Y_{ci}$ of the position in the proceeding direction, while the tread factor error $\delta A$ shown in equation (31) affects the azimuth deviation $\delta\Theta_{ci}$, respectively.

Equations (26) through (31) do not respectively lead out numerical relationship between the deviation of the position and the azimuth of the travelling vehicle and the error of the vehicle factor, but they respectively lead out elements of deviations. Concretely, due to the difference ($\delta H_L-\delta H_R$) of errors present in the left and right pulse factors, deviation takes place with $X_{ci}$. Likewise, due to the average error $\delta H$ present in the left and right pulse factors, deviation takes place with $y_{ci}$. Also, due to the tread factor error $\delta A$, deviation takes place with $\Theta_{ci}$. Thus, in order to allow the vehicle to correctly travel through the predetermined route, these errors should be corrected to change the vehicle factors.

The difference ($\delta H_L-\delta H_R$) of the errors of the left and right pulse factors also affects the azimuth deviation $\delta\Theta_{ci}$. However, according to equation (26), since $\delta X_{ci}$ is proportional to the square of Lds, the difference ($\delta H_L-\delta H_R$) of the errors of the left and right pulse factor is amplified to eventually affect $\delta X_{ci}$ more adversely than $\delta\Theta_{ci}$. Consequently, since in the guiding method of the invention, the presence of the horizontal position deviation $\delta X_{ci}$, which is significantly affected by the difference ($\delta H_L-\delta H_R$) of the error of the left and right pulse factors is detected and then these factors are varied, deviation of the azimuth $\theta$ which is less affected by the difference ($\delta H_L-\delta H_R$) than $\delta X_{ci}$ can effectively be improved, and thus, the difference ($\delta H_L-\delta H_R$) by detecting the presence of the azimuth deviation $\delta\Theta_{ci}$ is not corrected.

In order to vary the tread factor A, due to the relationship between deviation and error defined in equation (31), the azimuth deviation $\delta\Theta_{ci}$ of the vehicle during its spin turn should be detected. However, since the azimuth deviation of the vehicle during its spin turn cannot be detected by the fixed point correction by means of magnetic sensor employed for the present embodiment, the preferred embodiment varies tread factor A in accordance with the assumption described below. Assume that, when the vehicle travels straightforwardly after making a spin turn, deviation amount $\delta X_{ci}$ detected at the correction point is generated by tread factors $\delta A$. Accordingly, when the vehicle makes a spin turn after passing through a correction point, and then the vehicle passes through the next correction point straightforwardly to result in the occurrence of deviation amount $\delta X_{ci}$, the tread factor A is varied. On the other hand, when the vehicle travels straightforwardly between a distance from a correction point to the next correction point to also result in the occurrence of deviation amount $\delta X_{ci}$, ($\delta H_L-\delta H_R$) is corrected to vary values of $H_L$ and $H_R$ before eventually detecting deviation amount $\delta X_{ci}$.

In the preferred embodiment of the present invention, a fixed value of those factors mentioned above is either increased or decreased by effectively applying noise-resistant stationary magnification method in order that deviations of the position and the azimuth of the vehicle can gradually be corrected every time when fixed point correction is executed.

Figure 8:
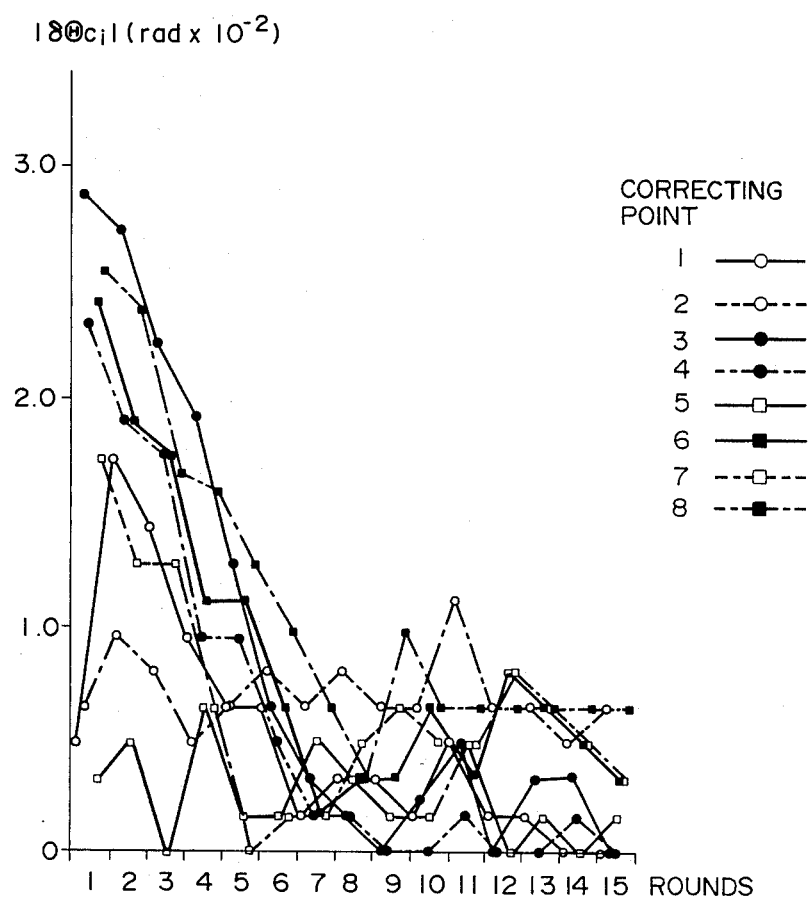
Figure 9:
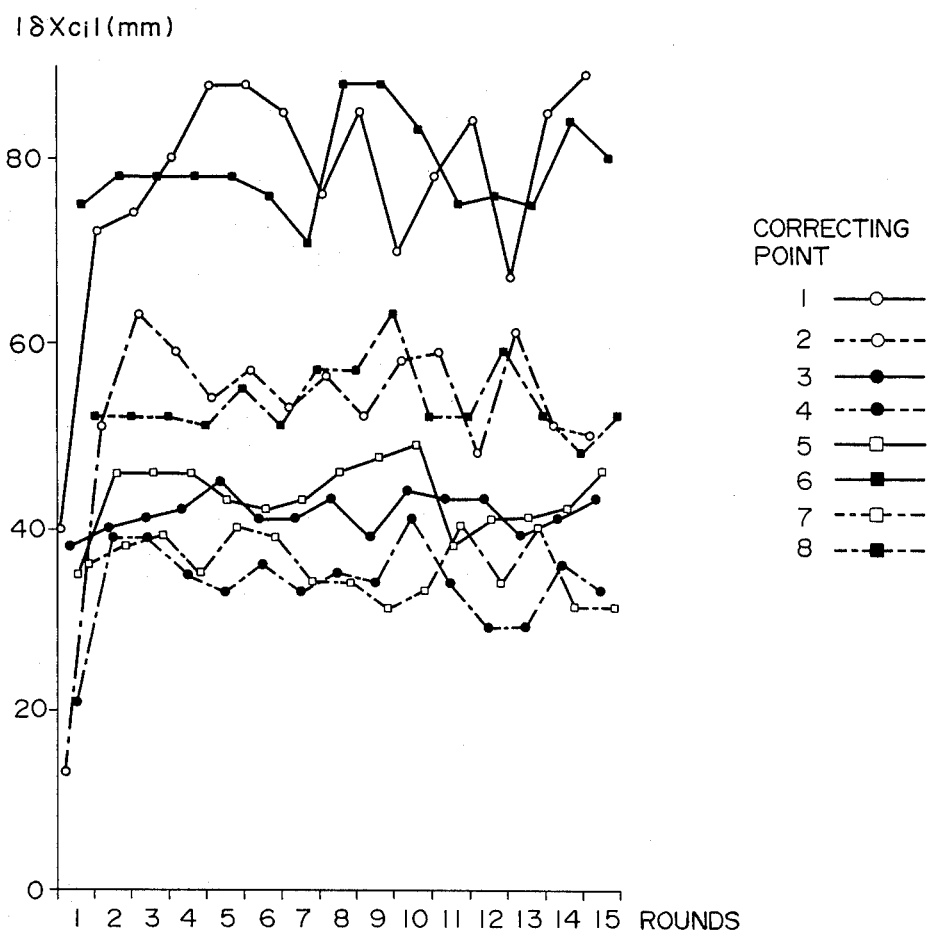
FIGS. 9 and 10 are the charts denoting variation of the deviation amounts of the position and the azimuth in the case of using stationary factors.
Figure 10:
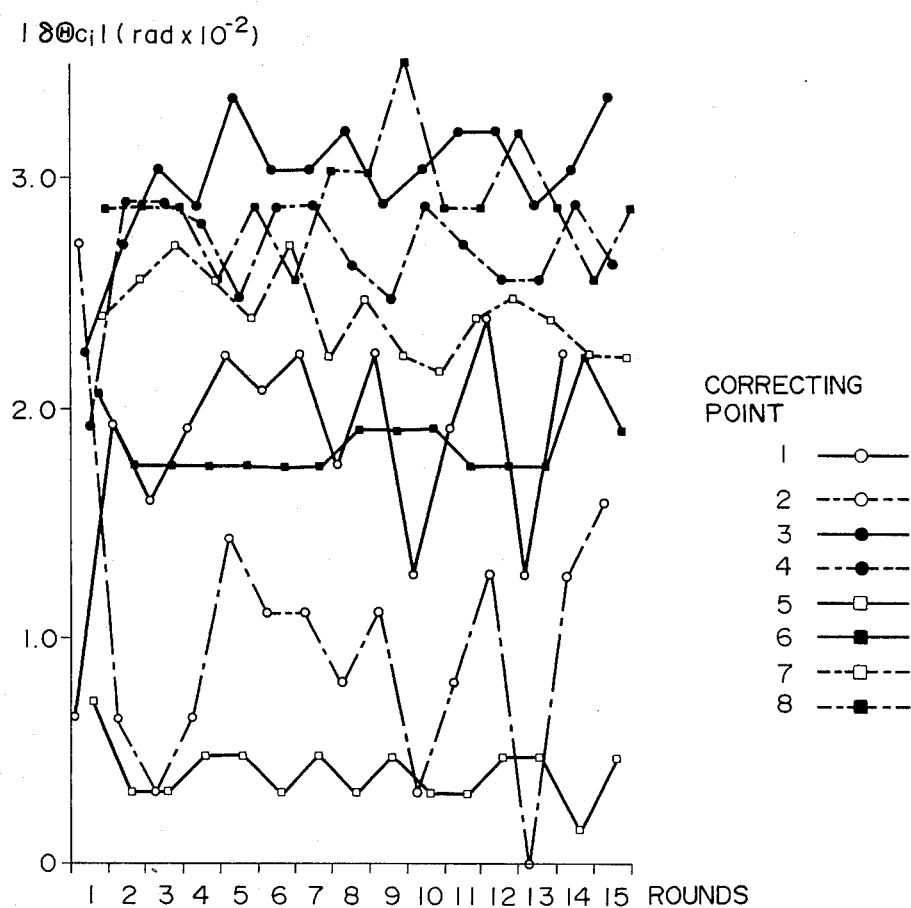

FIGS. 7 and 8 are respectively the charts denoted variation of the deviation amounts of the position and the azimuth of the travelling vehicle by properly varying the vehicle factor reflecting one of the preferred embodiments of the present invention. For comparison, variations of the deviation amounts of the position and the azimuth of the travelling vehicle in the case of using stationary factors are respectively shown in FIGS. 9 and 10. As is clear from these comparative drawings, after varying the vehicle factors, FIGS. 7 and 8 respectively indicate that the deviation amount significantly decreases by repeatedly applying corrections, thus eventually converging the deviation amount into an extremely minimal range. Conversely, FIGS. 9 and 10 respective indicate that the deviation amount does not substantially decrease itself even after applying stationary factors.

Before executing experiments in conjunction with FIGS. 7 through 10, a circulation course was provided for measuring deviation components $\delta X_{ci}$ and $\delta\Theta_{ci}$ generated by the circular movement of the vehicle while correcting the vehicle factor on the way of its travelling. Deviation was corrected at eight points per one circulation of the vehicle, and thus the vehicle factor was varied at the every eight points. The tread factor was varied at four points, whereas the pulse factor was varied at other four points. The horizontal axis shown in FIGS. 7 through 10 respectively denote the number of the circular movements done by the vehicle, whereas the vertical axis respectively denote the amount of deviation. FIGS. 7 and 8 clearly indicate that the deviation amount significantly diminishes as the vehicle followed up its circular movement for many rounds. After completing the 8th and 9th circular movements, deviation amount $\delta X_{ci}$ actually diminished to a maximum of about ±15 mm, while deviation amount $\delta\Theta_{ci}$ also diminished itself to a maximum of 0.01 rad.(=0.57°).

The method for improving the precision in guiding the vehicle by varying factors mentioned above is also effectively applicable to the correction of the deviation of gyroscope when applying it to the presumptive navigation method.

Normally, any conventional gyroscope unavoidably incurs a certain deviation from drift, and thus operational error is generated by deviation. To securely correct for deviation caused by drift and minimize operational error, the preferred embodiment of the present invention can usefully be applied to the adjustment of output from gyroscope.

The preferred embodiment typically uses magnets and magnetic sensors for fixed point correction. However, it is also possible to optically sense the correction marks.

In addition, the preferred embodiment mentioned above employs stationary magnification method for varying coefficients. However, the spirit and scope of the present invention are not limitative of using only the stationary magnification method.

Conventionally, the autonomous vehicle is subjected to a guiding operation in accordance with estimation of its position and the azimuth to allow the correction for the deviation of the position and the azimuth at optional points. However, when substantial error is present in the dimension or the tread of wheels making up the basis for estimating the position and the azimuth of the travelling of the vehicle itself, even after correcting for the deviation, the vehicle still follows up travelling in the manner of causing identical deviations to occur like the one before the correction is applied, and as a result, precision in guiding the vehicle to the next correction point gradually lowers. On the other hand, as error increments due to worn wheels after continuous services of the vehicle for many years, when a stationary factor is applied, the vehicle may easily be guided to a position where the position and the azimuth of the travelling vehicle cannot be corrected for, i.e., to a position remote from the fixed point correction marks.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A guiding method for an autonomous traveling vehicle which travels along a predetermined, internally set route by individual control of rotation of the wheels mounted on both the right and left sides of the traveling direction thereof so that the traveling direction of said autonomous traveling vehicle is controlled wherein a pair of magnets being previously arranged along an actual route corresponding to the predetermined route for fixed point correction, and comprising the following steps:

individually detecting the number of the rotations of said wheels;

estimating the position and azimuth of said autonomous traveling vehicle based on the detected number of rotations of said wheels and on factors determined by the specification of said autonomous traveling vehicle; and guiding said autonomous traveling vehicle toward said route based on the estimated position and azimuth and said internally set route; and when any one of said magnets is detected, the position and azimuth of said autonomous traveling vehicle are detected based on the relationship of the relative position between said detected magnet and said autonomous traveling vehicle, the deviation of the detected position and azimuth from said estimated position and azimuth are detected, said factors related to said deviation are changed, and further guiding of said autonomous traveling vehicle is executed based on the varied factors.

2. A guiding method for an autonomous travelling vehicle as set forth in claim 1, wherein one of said factors is the tread of wheels mounted on both the right and left sides of said autonomous travelling vehicle.

3. A guiding method for an autonomous travelling vehicle as set forth in claim 1, wherein one of said factors is the travelling distance per unit control of rotation of respective wheels mounted on both the right and left sides of said autonomous travelling vehicle.

* * * * *